United States Patent [19]

Lee

[11] 4,333,445
[45] Jun. 8, 1982

[54] FLUIDIZED BED SOLAR ENERGY HEATER

[76] Inventor: Donald M. Lee, 92 S. Altamont Rd., Huntington, W. Va. 25701

[21] Appl. No.: 115,241

[22] Filed: Jan. 24, 1980

[51] Int. Cl.$^3$ .............................................. F24J 3/02
[52] U.S. Cl. .................................. 126/436; 126/430; 126/435; 126/449; 126/900
[58] Field of Search ............... 126/430, 435, 449, 900, 126/436; 165/104.16; 34/93

[56] References Cited

U.S. PATENT DOCUMENTS

| | | | |
|---|---|---|---|
| 2,484,127 | 10/1949 | Stelzer | 126/436 |
| 3,894,686 | 7/1975 | Keyes et al. | 126/430 X |
| 3,908,632 | 9/1975 | Poulsen | 126/900 |
| 4,055,948 | 11/1977 | Kraus et al. | 126/900 X |
| 4,095,428 | 6/1978 | Warren | 126/449 |
| 4,116,222 | 9/1978 | Seifried | 126/435 |
| 4,218,290 | 8/1980 | Phillips et al. | 165/104.16 |
| 4,245,693 | 1/1981 | Cheng | 165/104.16 |
| 4,273,101 | 6/1981 | Merges | 126/435 |

FOREIGN PATENT DOCUMENTS 1176174  11/1958  France ............................ 126/432

OTHER PUBLICATIONS

"Small Particle Heat Exchangers", Arlon J. Hunt, Lawrence Berkeley Lab., University of California/Berkeley, LBL-7841, Jun. 1978.

*Primary Examiner*—Larry Jones
*Attorney, Agent, or Firm*—Millard & Cox

[57] ABSTRACT

Disclosed is an improved solar air heater which comprises an air fluidized bed unit having:
  (a) an inlet for incoming cool air;
  (b) an outlet for heated air;
  (c) a clear coverplate;
  (d) a solar heat collector element disposed within said unit for absorbing heat from solar energy entering said unit through said cover plate; and
  (e) a fluidization zone disposed within said unit wherein a bed of particles is fluidized by said incoming cool air, said bed and said fluidizing cool air absorbing heat from solar energy entering said unit through said cover plate and/or from said solar heated collector element, said particles being resistant to appreciable attrition and substantially non-dusting.

11 Claims, 4 Drawing Figures

FLUIDIZED BED SOLAR ENERGY HEATER

BACKGROUND OF THE INVENTION

The present invention relates to solar energy heaters and more particularly to one which employs a fluidized bed.

A variety of schemes have been devised for increasing the efficiency of heating the air in solar air heaters. Such schemes include the specific focusing of the sun rays onto the solar air heater, design of intricate and complicated heat-absorbing panels disposed within the solar air heater, just to mention but two of such proposals. For a solar air heater, it has been proposed to heat a compressed gas containing minute carbon fines (eg. 600 A in diameter) by solar energy for powering a Brayton cycle gas turbine. The carbon fines are oxidized during the solar energy absorption step and the resulting gas exhausted to the atmosphere from the turbine. (Arlon J. Hunt, *Small Paticle Heat Exchanges*, Lawrence Berkeley Laboratory, University of California/Berkeley, LBL-7841, June 1978). No heat storage from the carbon fines nor reuse thereof is even remotely proposed. For solar liquid heaters, it even has been proposed to combine the sun focusing effect with high boiling solar-absorbing fluids of critical optical density wherein minute colloidal size particles are suspended within such transparent solar-absorbing liquid (U.S. Pat. No. 4,055,958). The heat that is collected in solar liquid heaters can be stored for later use by simple heat-insulating storage of the heated liquid withdrawn from the solar heater. Storage of the heat from a solar air heater, though, is a more difficult task. Prior proposals in this area, for example, include use of the solar heated air to heat stone or the like for storage of the heat (U.S. Pat. Nos. 3,894,685 and 2,484,127).

The present invention provides a solar air heater which is exceedingly efficient in heating air and which provides a simple and practical method for storing heat from the solar air heater.

BROAD STATEMENT OF THE INVENTION

The present invention is an improved solar air heater comprising an air fluidized bed unit. Such unit has
  (a) an inlet for incoming cool air;
  (b) an outlet for heated air;
  (c) a clear cover plate;
  (d) a solar heat collector element disposed within said unit for absorbing heat from solar energy entering said unit through said cover plate; and
  (e) a fluidization zone disposed within said unit wherein a bed of particles is fluidized by said incoming cool air,
said bed and said fluidized cool air absorbing heat from solar energy entering said unit through said cover plate and/or from said solar heated collector element, said particles being resistant to appreciable attrition and substantially non-dusting.

Another aspect of the invention is a method for heating air using the solar air heater of the present invention. A further aspect of the present invention is a method for storing heat collected in the solar air heater of the present invention wherein the heated air and heated particles are withdrawn from the solar air heater, the heated particles separated from the heated air, and such separated heated particles insulatingly stored. The stored heated particles then can have cool air passed therethrough at a later time for utilizing the heat stored therein.

Instrumentation, controls, feeder, agitators, fittings, pumps, blowers, and valves are not shown, but are to be provided when necessary or desirable in conventional fashion. The materials of construction for the process are conventional. Thus, corrosion-resistant materials, such as austenitic stainless steel, ceramic, plastic, glass-lined steel, wood, or even clay, can be used where necessary. Concrete or steel can be used where corrosion or erosion is inconsequential. Various of the tanks and lines illustrated can be in multiple, series, cascade, or parallel connected for addition treating time or capacity.

The drawings will be described in detail in connection with the detailed description of the invention which follows.

DETAILED DESCRIPTION OF THE INVENTION

Figure 1:
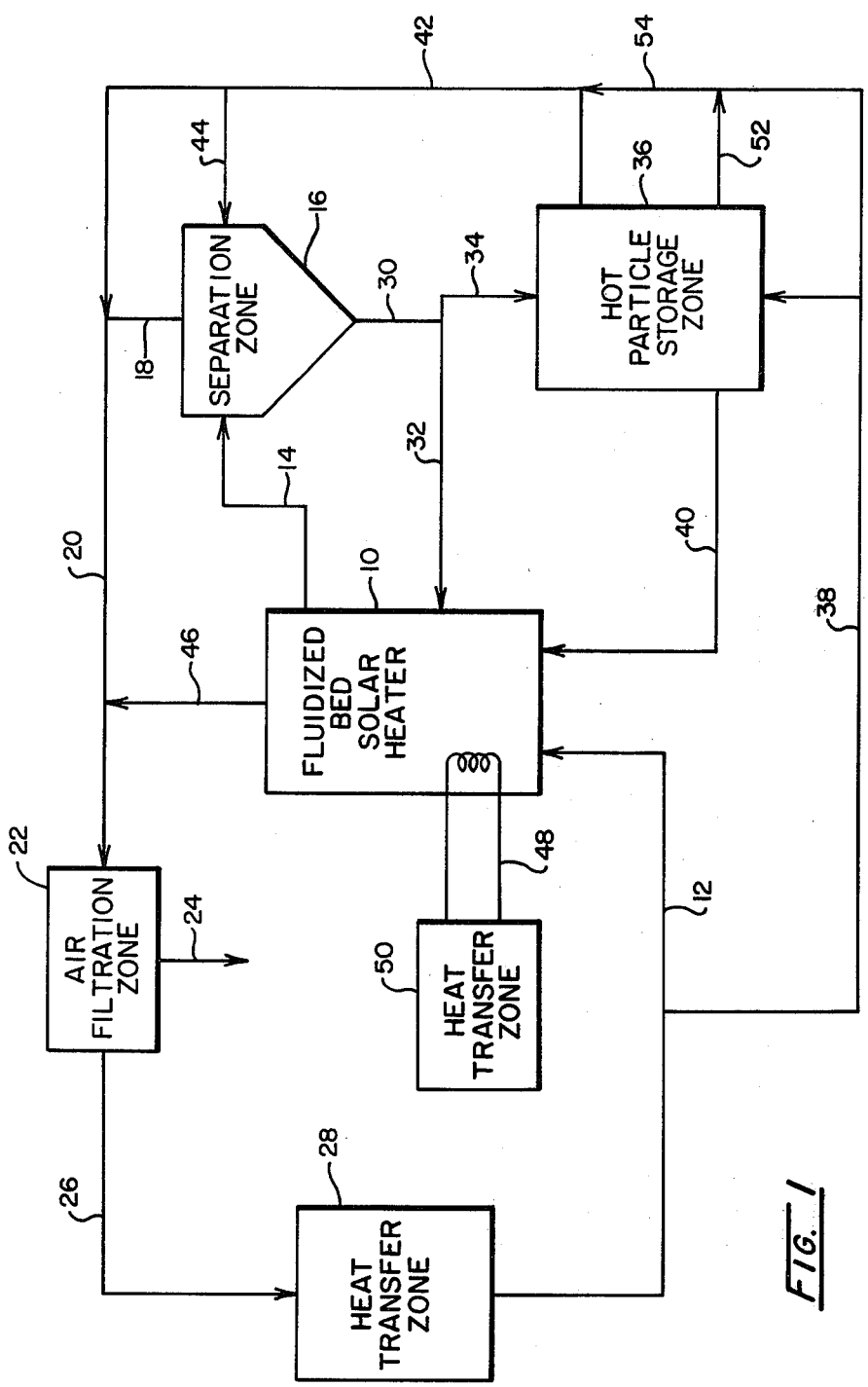
FIG. 1 is a flow diagram showing how the present invention can be practiced.

Referring to FIG. 1, broadly there are two different embodiments for operating fluidized bed solar heater 10. The first embodiment operates with heated air and particles being concurrently withdrawn from the fluidized bed solar heater. Such an operation has been referred to in the literature as an entrained bed, transported bed, fast-fluidized bed, or the like, depending upon the particular literature being consulted. The present invention focuses on the ultimate location of the fluidized bed in the process, though the conditions of fluidization should not be overlooked. Thus, the first embodiment will be referred to as the transported bed embodiment because the bed is transported from the heater. The second embodiment, while often termed a dense bed operation in the literature, will be referred to as the fixed bed embodiment because the location of the bed is fixed within the heater during the process.

Referring to the transported bed embodiment, fluidized bed solar heater 10 has an inlet for admission of cool air 12 which not only is to be heated in solar heater 10 but also supports the particles for their fludization within solar heater 10. A detailed description of solar heater 10 will be provided in connection with the description of FIGS. 2, 3, and 4 which follows. Air is conveyed in line 12 and forced through the particles in solar heater 10 by a pump or blower not shown. The flow of heated air and heated particles is withdrawn from solar heater 10 through line 14 and passed into separation zone 16 which suitably can be cyclone or like conventional separation equipment. The hot air exits separation zone 16 through line 18 into line 20 for admission to optional air filtration zone 22 which provides removal of unseparated particles withdrawn from separation zone 16. Particles separated in air filtration zone 22 are withdrawn therefrom through line 24 and may be passed back into solar heater 10 by a line not shown in the drawing. The filtered hot air from zone 22 is withdrawn through line 26 and passed into heat transfer zone 28 which provides for the actual use of the heated air by extraction of heat therefrom. Heat transfer zone 28 can utilize the heated air directly for space heating, drying of moist particulates, transfer of heat to another fluid, or any similar conventional use of heated air. Upon extraction of heat from the heated air in zone 28, resulting cold air preferably is passed via line 12 back into solar heater 10 in conventional fashion.

The separated hot particles can be withdrawn from separation zone 16 via line 30 and passed back into solar heater 10 through line 32, or can be passed from line 30 through line 34 into hot particle storage zone 36. Also admitted into hot particle storage zone 36 is a flow of cold air 38, suitably vented from line 12 which carries cold air to solar heater 10. The cold air through line 38 absorbs heat from the hot particles in storage zone 36 with resulting cooled particles being withdrawn from zone 36 and passed back into solar heater 10 through line 40. The heated air from storage zone 36 is withdrawn through line 42 and can be channeled directly into line 20 carrying hot air from separation zone 16 or can be passed into separation zone 16 through line 44 for separating any particles entrained in the flow of air withdrawn from storage zone 36.

Alternatively and preferably, the hot particles can be picked up from zone 36 by a flow of cold air in line 38 by feeding the hot particles through line 52 into line 38. The combined flow then in line 54 and thence into line 42 would have the particles rapidly transfer their heat to the cold air flow due to their large surface area. Separation of the resulting cold particles and hot air can be accomplished with separation zone 16 as described above.

For the fixed bed embodiment, hot air in solar heater 10 is withdrawn through line 46 for admission into line 20 and thence into air filtration zone 22 as previously described. The particles remain in solar heater 10 and, thus, there is no need for separation zone 16 nor storage zone 36. In this embodiment the hot air from solar heater 10 is used in the same manner as described for the transported bed embodiment as will be apparent to those skilled in the art.

It should be appreciated that the process can be operated under both of the foregoing embodiment during daylight hours; however, for maximum utilization of the fluidized bed solar heater of the present invention, the transported bed embodiment is preferred because the heated particles can be accumulated and stored in storage zone 36 which may optionally comprise multiple storage zones. Of course, storage zone 36 would be required to be fully insulated to protect from heat loss. The accumulated heated particles in storage zone 36 then can be used at night for heating air preferably by combining a cold air flow with the heated particles, such as in line 54 as previously described. Thus, during the daylight hours, the heated air and/or the heated particles can be used for converting solar energy into a more useful form, while the heated particles can be used at night for heating air. Certainly the economies and efficiencies of such a process can be appreciated.

It should be noted that it is possible to additionally extract usable heat from solar heater 10 through line 48 which is disposed within the fluidized bed in solar heater 10. The fluid within line 48 then is passed into heat transfer zone 50 which preferably can comprise a conventional heat pump. Again, an especially efficient and economic heat transfer system is described.

Figure 2:
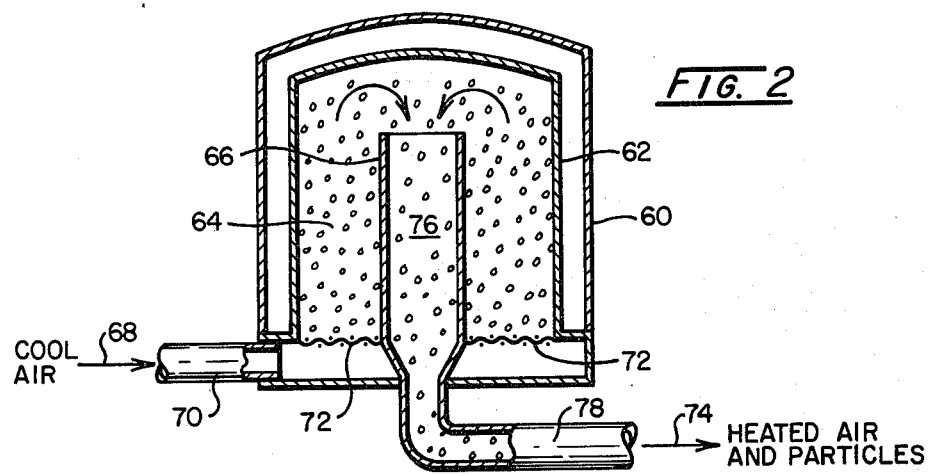
FIG. 2 shows one embodiment of the fluidized bed solar energy heater of the present invention.

Referring to FIG. 2 the fluidized bed solar heater depicted there in vertical cross-sectional elevation is designed to operate in conjunction with the transported-location bed embodiment described in connection with FIG. 1 above. The fluidized bed solar heater can be cylindrical, rectangular, or any other convenient geometric shape in horizontal cross-sectional elevation. The fluidized bed solar heater has transparent cover 60 which defines its outer configuration and permits solar energy to pass therein. In spaced-apart relationship from transparent cover 60 is black body 62 which is the collector element for the solar heater. Collector element 62 either is manufactured to be black in color or is coated with dull, flat black paint for maximizing heat absorption. It is constructed preferably of metal, such as aluminum, copper or the like, for maximizing heat absorption and heat transfer within the solar heater. While element 62 preferably is smooth in configuration, it can be corrugated or contain pleatings or ribbings, usually longitudinally to the air flow, in order to maximize the heat absorption area. Such uneven configuration to collector 62 may add to the turbulence created within the fluidized bed disposed within the solar heater, though such additional turbulence is not deleterious to the operation of the solar heater. On the other hand, cover 60 preferably is quite smooth to minimize wind drag. Transparent cover 60 advantageously is clear glass for obtaining desirable wavelengths of energy. If the glass is ordinary window glass, it is usually about 3/16 inch thick; if tempered, it need only be about 1/8 inch thick; if it is a clear acrylic or polycarbonate plastic, it can be as thin as 1/16 inch or less, or even could be flexible and inflatable with a flow of air. While the space between cover 60 and element 62 can be a dead air space, it can be desirable on occasion to admit a minor air flow through such space in order to suppress condensation on the inside of transparent cover 60.

Fluidization zone 64 is defined by element 62 and wall 66. Wall 66 also effectively acts as a weir which can be adjusted for maintaining the bed height and residence time of the particulates in the bed. Cool air 68 is manifolded into the solar heater through pipe 70 and thence into the solar heater through distribution plate or grid 72 which preferably is perforated or the like for admitting air into the heater but retaining particles therein. Grid 72, of course, is optional as its presence is not necessary for the retention of bed 64 in the solar heater. Particles can be admitted into the solar heater suspended in the flow of cold air in pipe 70 if desired. The fluidized bed is formed with the support of the cool air passed through distribution plate 72 into fluidization zone 64. Such gas fluidization of particles can be practiced in conventional fashion, such as described in Kirk-Othmer, *Encyclopedia of Chemical Technology*, Second Edition, Vol. 9, page 398, Interscience Publishers, New York, New York (1966), the same being incorporated herein by reference. The fluidized bed within the solar heater provides substantially high heat transfer coefficients from collector 62 to the air and particles forming the fluidized bed. The heat transfer coefficient of the fluidized bed within the solar heater of the present invention can have a heat transfer coefficient which is from 5 to 20 times higher than the heat transfer coefficient for the identical unit operating with only air passing therethrough. The heated air and particulates pass over interior wall 66 into conduit 70 and are withdrawn from the solar heater through pipe 72.

Figure 3:
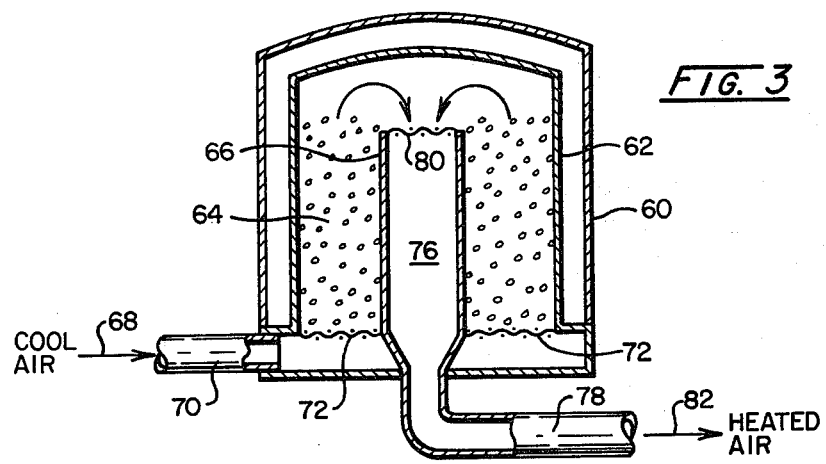
FIG. 3 shows another embodiment of the fluidized bed solar energy heater of the present invention.

The solar heater depicted in FIG. 3 in cross-sectional vertical elevation is designed to operate with the fixed-location bed embodiment described in connection with FIG. 1. Its construction and operation is identical to that of the solar heater depicted in FIG. 2 except that perforated plate or screen 80 extends across walls 66 for retaining the particles within fluidized bed 64 but permitting heated air to pass into chamber 76 for its withdrawal through pipe 78 as flow 82. It should be recognized, however, that screen 80 is not necessary provided that sufficient free board is provided so that the particles remain in bed 64. It should be noted that the solar heaters of FIGS. 2 and 3 can have appropriate insulation, optionally movable, placed on the side opposite the solar incidence as is necessary, desirable, or convenient. Also, additional insulation is to be provided for those lines and areas where heat leak is to be expected.

Figure 4:
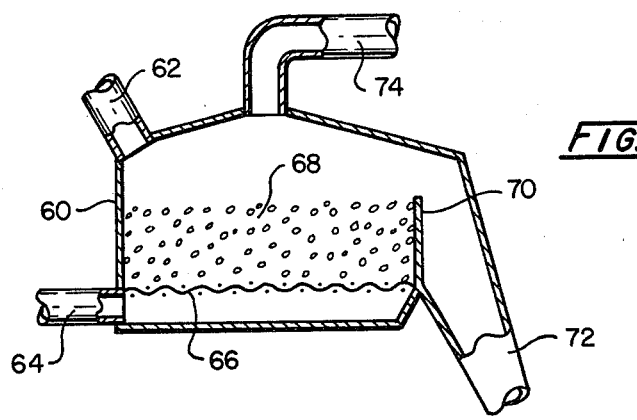
FIG. 4 shows a further embodiment of the fluidized bed solar energy heater of the present invention.

Another solar heater embodiment is depicted in FIG. 4 in cross-sectional vertical elevation and can be operated with both the transported and fixed bed embodiments. Shell 60 is a vertical body of suitable geometric shape (i.e. rectangular, circular, etc.) which houses fluidized bed 68 of particulates which preferably are black in color. A conventional double wall construction of transparent material is used for shell 60. The particles are admitted into bed 68, if required, through inlet 62. Alternatively, the particles can be admitted into bed 68 suspended in the flow of cold air entering in line 64. Inlet 62, then, would not be required. Bed 68 is maintained by supporting cooling gas which enters through line 64, passes through support screen or grid 66, and through the particles to form bed 68. The height of bed 68 is controlled by adjustable weir 70. Again, screen 66 is not necessary in order that bed 68 be retained within the heater. Should excessive clogging of screen 66 occur, it should be removed from the solar heater in order to minimize lengthy blowback times.

For the fixed bed embodiment, heated air is exhausted from line 74 and can be passed through a bag filter (not shown) for removal of entrained fines. Desirable, outlet 72 is closed. For the transported bed embodiment, heated air can be exhausted through outlet 74, outlet 72, or a combination thereof. The particles flow over weir 70 after a predetermined residence time in bed 78 and are transported by entrainment in the heated air or by an auxiliary flow of cool air (not shown) which can be heated thereby also. Additional or make-up particles may be passed into the heater through inlet 62. Outlet flow rates will be determined and the split of heated air between outlets 72 and 74 by such factors as the inlet flow rate of cool air, the height of bed 68 controlled by weir 70 (and, thus, the residence time of the particles in bed 68), and like factors.

The particles utilized in the present invention should be resistant to appreciable attrition and substantially non-dusting in order to maximize their life expectancy and to curtail unwanted pollution and possible toxicity. Thus, the particles should be chemically inert (except for possible minor oxidation) and physically inert (non-dusting and attrition resistant) in the system. The preferred particles for use in the solar heater of the present invention are aragonite (calcium carbonate or limestone) particles preferably of about 70 mesh to 200 mesh in particle size. See Zenz & Othmer, *Fluidization and Fluid-Particle Systems*, p 251, Reinhold Publishing Corp., New York, New York (1960). A typical particle distribution would be 99% less than 150 microns with approximately 1% less than 10 microns. Other possible useful particles include various aluminas, ceramic bodies, glass, glass composites, various metal particulates and the like. As described at pages 117-119 in Zenz & Othmer, supra, the incipient fluidization point (i.e. the point at which the solid bed becomes fluid) occurs at about 0.1 feet/second gas velocity in an ideal bed and is accompanied by a dramatic change in the viscosity of the bed. At this point and with higher gas velocities, the heat transfer of the bed rises greatly. It is this exceptionally high heat transfer that is utilized in the solar heater of the present invention.

It should be noted that the heat transfer efficiency of the fluidized bed unit is so sufficiently favorably that only about 5-10% of the incident solar energy is required for a blower to force air into the heater to fluidize the bed of particles therein.

I claim:

1. In combination, a fluidized bed of dark particles contained within a solar heater, a gas filter, a zone for receiving heat, means for separating said particles from a gas and a storage zone for storing heated particles, including:

means for transmitting and admitting unheated gas to the solar heater under sufficient volume and pressure to maintain the particles within the solar heater in the physical state of a fluidized bed, said solar heater being an enclosed container covered by a transparent wall facing in the direction of the sun whereby the rays of the sun will pass through said wall and heat the contents of said container, means for receiving heated gas from said solar heater and transporting it to the gas filter, said gas filter including means to separate said gas from solids entrained therein, means for transporting gas from said gas filter to the zone for receiving heat, means for transporting heated gas and particles from said solar heater to a separator, said particles being in the physical state of a transported bed in their movement from the heater to the separator, said separator including means for separating said gas from said particles, means for transporting heated gas from said separator to said gas filter, means for transporting said heated particles from said separator to said storage zone, means for passing unheated gas through the heated particles in the storage zone and subsequently to the gas filter, and means for transporting cooled particles from said storage zone to the solar heater.

2. The combination of claim 1 wherein the particles in the storage zone are in the physical state of a fluidized bed when the unheated gas is moving therethrough and some particles are entrained in the gas as it exits the storage zone, means for transporting said exiting gas and particles to said separator.

3. The combination of claim 2 including separate heat exchanger means for extracting heat from the solar heater in addition to the heat extracted by said unheated gas passing therethrough and the heated particles exiting the heater.

4. The combination of claim 3 including weir means within said solar heater for controlling the residence time of particles in the solar energy and the volume rate of particles exiting the solar heater.

5. The combination of claim 4 including insulation around the area of the solar heater which is not exposed to the rays of the sun.

6. The combination of claim 5 wherein the solar heater includes a double walled cover facing the direction of the sun with the outer wall being transparent and the inner wall having a black surface facing the sun.

7. The combination of claim 1 wherein the solar heater includes a double walled cover facing the direction of the sun with the outer wall being transparent and the inner wall having a black surface facing the sun.

8. The combination of claim 1 including separate heat exchanger means for extracting heat from the solar heater in addition to the heat extracted by said unheated gas passing therethrough and the heated particles exiting the heater.

9. The combination of claim 1 including weir means within said solar heater for controlling the residence time of particles in the solar heater and the volume rate of particles exiting the solar heater.

10. The combination of claim 1 including insulation around the area of the solar heater which is not exposed to the rays of the sun.

11. The combination of claim 10 wherein the solar heater includes a double walled cover facing the direction of the sun with the outer wall being transparent and the inner wall having a black surface facing the sun.

* * * * *